Patented Mar. 1, 1938

2,109,518

UNITED STATES PATENT OFFICE 2,109,518

PROCESS FOR PRODUCING COMPOUNDS OF THE PHENANTHRENE SERIES

Werner Zerweck and Karl Schütz, Frankfort-on-the-Main-Fechenheim, Germany, assignors to General Aniline Works, Inc., New York, N. Y., a corporation of Delaware No Drawing. Application June 24, 1936, Serial No 87,013. In Germany June 29, 1935

1 Claim. (Cl. 260—108)

Our invention relates to a process for producing compounds of the phenanthrene series. The new process comprises acting with agents suitable for splitting off hydrogen halide on compounds of the general formula:

wherein R stands for a member of the group consisting of

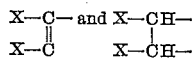

(X meaning a member of the group consisting of hydrogen and —COOH) and $R_1$ and $R_2$ stand for radicals of the benzene series, at least one of them containing a halogen atom in o-position to the linking with R.

The reaction probably takes place in such a manner that one of the carbocyclic rings reacts while splitting off hydrogen halide with the other carbocyclic ring whereby a derivative of the phenanthrene series is formed. Beside the splitting off hydrogen chloride there may also be split off hydrogen or other substituents from the group marked R in the above formula.

The phenanthrene derivatives thus obtained are in part new compounds, and in part they are only difficultly accessible according to the known methods. Most of them are valuable intermediates for the production of dyestuffs and pharmaceutical products.

In order to further illustrate our invention the following examples are given, the parts being by weight and all temperatures in degrees centigrade. However, we wish it to be understood that our invention is not limited to the particular products nor reaction conditions mentioned therein.

Example 1

90 parts of α-phenyl-o-chlorocinnamic acid of the formula:

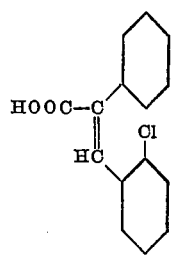

of 176° melting point are mixed with 450 parts of caustic potash and about 900 parts of quinoline and the mixture is heated to boiling for about 2 hours in an apparatus provided with a reflux condenser and a stirrer. Then the mass is poured on a mixture of ice and hydrochloric acid, the precipitate formed is filtered off and dissolved in an aqueous sodium carbonate solution. The solution obtained is freed by filtration from a little amount of products insoluble in alkaline solutions, the filtrate is precipitated with an acid and the precipitate is filtered off and dried. The phenanthrene-9-carboxylic acid thus obtained of the formula:

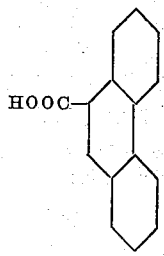

melts at 245–247°. When it is recrystallized from glacial acetic acid it melts at 253–254°.

By employing instead of caustic potash the same amount of a mixture containing 50% of caustic potash and 50% of caustic soda, the reaction may be carried out at about 150°.

The same phenanthrene-9-carboxylic acid is obtained by starting from the α-phenyl-o-chlorohydrocinnamic acid of the formula:

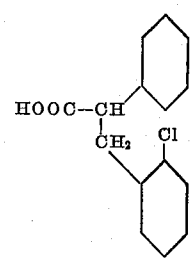

and acting as above described.

Example 2

90 parts of α-(o-chlorophenyl)-cinnamic acid of the formula:

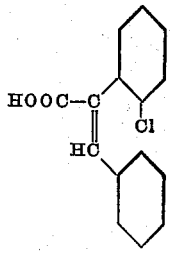

of 173° melting point are mixed with 450 parts of caustic potash and about 1800 parts of quinoline and the mixture is heated to about 200° for about 2 hours. Then the mass is worked up as described in Example 1, and the same phenanthrene-9-carboxylic acid is obtained.

Example 3

90 parts of o-chloro-cis-stilbene of the formula:

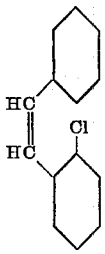

which is obtained by starting from α-phenyl-o-chloro-cinnamic acid and splitting off the carboxylic group by means of quinoline and powdered copper and which forms an oil of 120–122° boiling point under a pressure of 2 mm., 450 parts of caustic potash and about 1800 parts of quinoline are heated to boiling for about 2 hours in an apparatus provided with a reflux condenser and a stirrer. The mass is worked up as described in Example 1, and phenanthrene is obtained with a yield of more than 90% and good purity.

Example 4

90 parts of α-(o-chlorophenyl)-p-methyl-cinnamic acid of the formula:

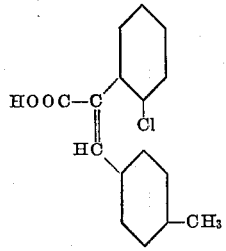

of 216–217° melting point, 450 parts of caustic potash and about 1800 parts of quinoline are mixed and the mixture is heated to boiling for about 2 hours in an apparatus provided with a reflux condenser and a stirrer. Then the mass is worked up as described in Example 1. Thus the 3-methyl-phenanthrene-9-carboxylic acid of the formula:

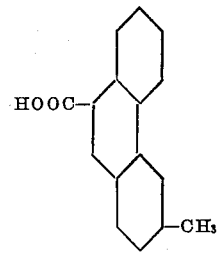

is obtained which melts at 243–244° when recrystallized from tetrachloro-ethane.

We claim:

A process for producing compounds of the phenanthrene series which comprises acting with agents suitable for splitting off hydrogen halide on compounds of the general formula:

wherein R stands for a member of the group consisting of

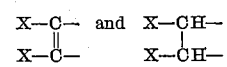

(X meaning a member of the group consisting of hydrogen and —COOH) and $R_1$ and $R_2$ stand for radicals of the benzene series, at least one of them containing a halogen atom in o-position to the linking with R.

WERNER ZERWECK.
KARL SCHÜTZ.